(12) United States Patent
Hietalahti et al.

(10) Patent No.: US 8,548,469 B1
(45) Date of Patent: Oct. 1, 2013

(54) APPARATUS AND METHOD OF ATTACHING A WIRELESS DEVICE TO A WIRELESS NETWORK

(71) Applicant: Renesas Mobile Corporation, Tokyo (JP)

(72) Inventors: Hannu Petri Hietalahti, Kiviniemi (FI); Marko Tapani Niemi, Oulu (FI); Hannu Eero Oskari Bergius, Kangasala (FI); Jorma Johannes Kaikkonen, Oulu (FI)

(73) Assignees: Renesas Mobile Corporation, Tokyo (JP); Renesas Electronics Corporation, Tokyo (JP)

( * ) Notice: Subject to any disclaimer, the term of this patent is extended or adjusted under 35 U.S.C. 154(b) by 0 days.

(21) Appl. No.: 13/668,940

(22) Filed: Nov. 5, 2012

(30) Foreign Application Priority Data

Nov. 2, 2012 (GB) .................................. 1219785.1

(51) Int. Cl.
*H04W 60/06* (2009.01)
(52) U.S. Cl.
USPC .......................... 455/435.1; 455/423; 370/328
(58) Field of Classification Search
USPC ................ 455/423, 435.1, 435.2, 510, 422.1; 370/328, 310
See application file for complete search history.

(56) References Cited

U.S. PATENT DOCUMENTS

| | | | | |
|---|---|---|---|---|
| 2013/0012204 A1* | 1/2013 | Kim et al. | ................... | 455/435.1 |
| 2013/0121241 A1* | 5/2013 | Sebire | ........................... | 370/328 |

FOREIGN PATENT DOCUMENTS

GB 2489725 A 10/2012

OTHER PUBLICATIONS

International Search Report Application No. GB1219785.1, dated Mar. 28, 2013.
*Excessive TAU Delay*; 3GPP TSG CT WG1 Meeting #78 (May 2012) 9 pages.
*Excessive TAU Delay Solution Alternatives*; 3GPP TSG CT WG1 Meeting #80 (Oct. 2012) 7 pages.
*Handling of Re-attach Following TAU Reject or Service Request Reject*; 3GPP TSG CT WG1 Meeting #71 (May 2011) 6 pages
*NAS Signalling Connection Reuse at Reattach*; 3GPP TSG CT WG1 Meeting #72 (Jul. 2011) 22 pages.
*Solving Excessive TAU Delay*; 3GPP TSG CT WG1 Meeting #79 (Aug. 2012) 12 pages.

* cited by examiner

*Primary Examiner* — Phuoc Doan
(74) *Attorney, Agent, or Firm* — Alston & Bird LLP

(57) ABSTRACT

An apparatus and method for attaching a wireless device to a wireless network. The apparatus comprises a processor arranged to, responsive to receipt of a reject message from a network control apparatus, cause the wireless device to: transmit a first attach request to the network control apparatus using a first communication layer and an existing connection between the wireless device and the network control apparatus; and responsive to a notification of a failure of the first attach request originating from a second communication layer which is lower than the first communication layer, transmit a second attach request to the network control apparatus using the first communication layer and a new connection between the wireless device and the network control apparatus, wherein transmission of the second attach request is effected independently of a timer started on receipt of the notification of a failure.

21 Claims, 8 Drawing Sheets

US 8,548,469 B1

APPARATUS AND METHOD OF ATTACHING A WIRELESS DEVICE TO A WIRELESS NETWORK

CROSS REFERENCE TO RELATED APPLICATION

This application claims benefit under 35 U.S.C. §119(a) and 37 CFR 1.55 to UK patent application no. 1219785.1 filed on Nov. 2, 2012, the entire content of which is hereby incorporated by reference.

TECHNICAL FIELD

The present invention relates to an apparatus and method for attaching a wireless device to a wireless network.

BACKGROUND

In wireless communication networks the User Equipment (UE) attaches to the wireless network for services. During use, the UE can have to re-attach to the network for a variety of reasons, one reason is that the UE can receive a reject message from the network. When re-attachment is required, the user equipment issues an attach request to the wireless network.

In the 3GPP Long Term Evolution (LTE) system, attach requests are issued by the Non-Access Stratum (NAS). The NAS is the highest stratum of the control plane between the UE and the Mobility Management Entity (MME) which functions as a network control apparatus. Operation of the NAS in a LTE system is described in 3GPP TS 24.301 Version 11.4.0 (October 2012), incorporated herein by reference.

3GPP TS 24.301 allows two modes of operation for both the UE and the MME. In a first mode a Radio Resource Control (RRC) connection which is already open can be used for subsequent NAS transactions, including attach requests. In a second mode, a new RRC connection is required for each NAS transaction. However, there is no mechanism for the UE to determine whether the MME will operate in the first mode, and re-use an existing RRC connection, or the second mode, and require a new RRC connection.

Providing the UE makes the correct assumption about the mode used by the MME no problems occur. However, it has been found that when the UE makes an incorrect assumption about the mode used by the network a delay of around 10 seconds can be incurred in some circumstances.

SUMMARY

In accordance with a first exemplary embodiment of the present invention, there is provided an apparatus comprising at least one processor and at least one memory including computer program instructions. The at least one memory and computer program instructions are configured to, with the at least one processor and responsive to receipt of a reject message from a network control apparatus, cause the apparatus to at least to perform:

transmitting a first attach request to the network control apparatus using a first communication layer and an existing connection between the wireless device and the network control apparatus; and responsive to a notification of a failure of the first attach request originating from a second communication layer which is lower than the first communication layer, transmitting a second attach request to the network control apparatus using the first communication layer and a new connection between the wireless device and the network control apparatus, wherein transmission of the second attach request is effected independently of a timer started on receipt of the notification of a failure.

In accordance with another exemplary embodiment of the present invention, there is provided a method of attaching a wireless device to a wireless network. The method comprises, responsive to receipt of a reject message from a network control apparatus, at the wireless device:

transmitting a first attach request to the network control apparatus using a first communication layer and an existing connection between the wireless device and the network control apparatus; and responsive to a notification of a failure of the first attach request originating from a second communication layer which is lower than the first communication layer, transmitting a second attach request to the network control apparatus using the first communication layer and a new connection between the wireless device and the network control apparatus, wherein transmission of the second attach request is effected independently of a timer started on receipt of the notification of a failure.

In accordance with a further exemplary embodiment, there is provided an apparatus comprising at least one processor; and at least one memory including computer program instructions. The at least one memory and computer program instructions are configured to, with the at least one processor and responsive to receipt of a reject message from the network control apparatus, cause the apparatus to at least to perform:

monitoring for receipt of a connection release notification from the network control apparatus for a monitoring period;

responsive to receipt of a connection release notification within the monitoring period, transmitting a first attach request to the network control apparatus using a first communication layer and new connection between the wireless device and the network control apparatus; or otherwise, on expiry of the monitoring period, transmitting a first attach request to the network control apparatus using a first communication layer and an existing connection between the wireless device and the network control apparatus; and responsive to a notification of a failure of the first attach request originating from a second communication layer which is lower than the first communication layer, transmitting a second attach request to the network control apparatus using the first communication layer and a new connection between the wireless device and the network control apparatus, wherein transmission of the second attach request is effected independently of a timer started on receipt of the notification of a failure.

In accordance with a yet further embodiment of the present invention, there is provided a method of attaching a wireless device to a wireless network. The method comprises, responsive to receipt of a reject message from a network control apparatus, at the wireless device:

monitoring for receipt of a connection release notification from the network control apparatus for a monitoring period;

responsive to receipt of a connection release notification within the monitoring period, transmitting a first attach request to the network control apparatus using a first communication layer and new connection between the wireless device and the network control apparatus; or otherwise, on expiry of the monitoring period, transmitting a first attach request to the network control apparatus using a first communication layer and an existing connection between the wireless device and the network control apparatus; and responsive to a notification of a failure of the first attach request originating from a second communication layer which is lower than the first communication layer, transmitting a second attach request to the network control apparatus using the first communication layer and a new connection between the wireless device and the network control apparatus, wherein transmission of the second attach request is effected independently of a timer started on receipt of the notification of a failure.

Further features and advantages of the invention will become apparent from the following description of preferred embodiments of the invention, given by way of example only, which is made with reference to the accompanying drawings.

DETAILED DESCRIPTION

"Wireless devices" include in general any device capable of connecting wirelessly to a network, and includes in particular mobile devices including mobile or cell phones (including so-called "smart phones"), personal digital assistants, pagers, tablet and laptop computers, content-consumption or generation devices (for music and/or video for example), data cards, USB dongles, etc., as well as fixed or more static devices, such as personal computers, game consoles and other generally static entertainment devices, various other domestic and non-domestic machines and devices, etc. The term "user equipment" or UE is often used to refer to wireless devices in general, and particularly mobile wireless devices.

The terms "transmitter" and "receiver" are also used herein and are to be construed broadly to include the whole of a device that is transmitting/receiving wireless signals as well as only particular components of a device that are concerned with transmitting/receiving wireless signals or causing or leading to the transmission/reception of wireless signals.

Reference will be made in this specification to a "network control apparatus". In this respect, it will be understood that the "network control apparatus" is the overall apparatus that provides for general management and control of a network and connected devices. Such apparatus may in practice be constituted by several discrete pieces of equipment. As a particular example, LTE (Long Term Evolution) makes use of a so-called evolved Node B (eNB) where the RF transceiver and resource management/control functions are combined into a single entity. LTE also makes use of a so-called Mobility Management Entity (MME) which controls, amongst other things, mobility of wireless devices around the network. The term "network control apparatus" encompasses an eNB, an MME or any other access point to a network, unless the context requires otherwise.

Figure 1:
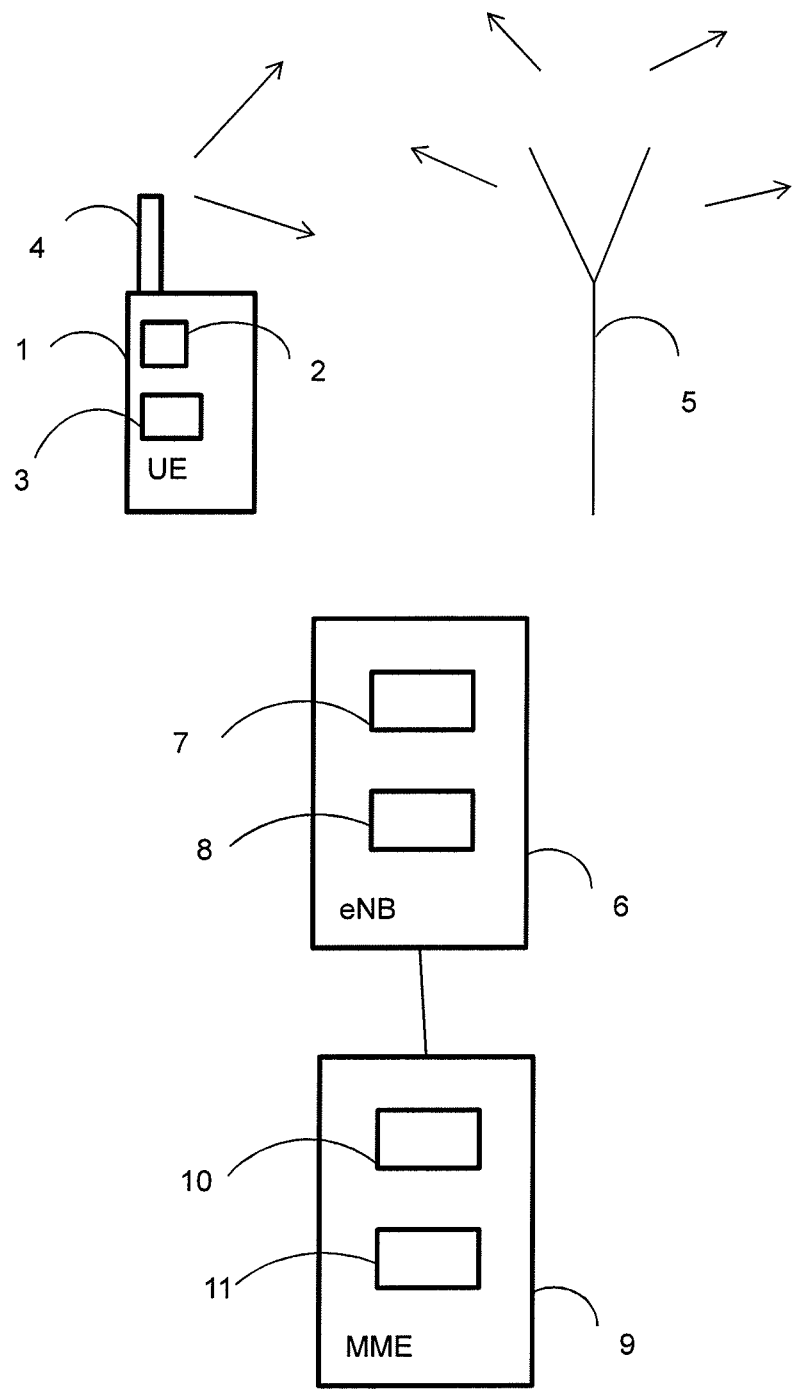
FIG. 1 is a diagrammatic representation in which embodiments of the present invention can be implemented.

FIG. 1 shows schematically an LTE system in which exemplary embodiments of the invention may be implemented. The system includes a user equipment (UE) or wireless device 1, in this case in the form of a mobile phone/smartphone. The UE 1 contains the necessary radio module 2, processor(s) and memory/memories 3, antenna 4, etc. to enable wireless communication with the network. The UE 1 in use is in communication with a radio mast 5. A so-called evolved Node B (eNB) 6 functions as a network control apparatus where the RF transceiver and resource management/control functions are combined into a single entity. The eNB 6 may have its own processor(s) 7 and memory/memories 8, etc.

The eNB 6 is in communication with a Mobility Management Entity (MME) 9 using, for example, an S1 interface. The MME functions as control node and therefore also functions as a network control apparatus. Its functions include tracking the UE 1. Various signalling procedures with the UE 1 terminate at the MME 9, including those from the Network Access Stratum (NAS) explained below in more detail. The MME 9 includes one or more processor(s) 10 and memory 11.

The example system of FIG. 1 has been explained with reference to LTE, the network may employ other mobile access mechanisms such LTE-Advanced (LTE-A) and/or the like.

Figure 2:
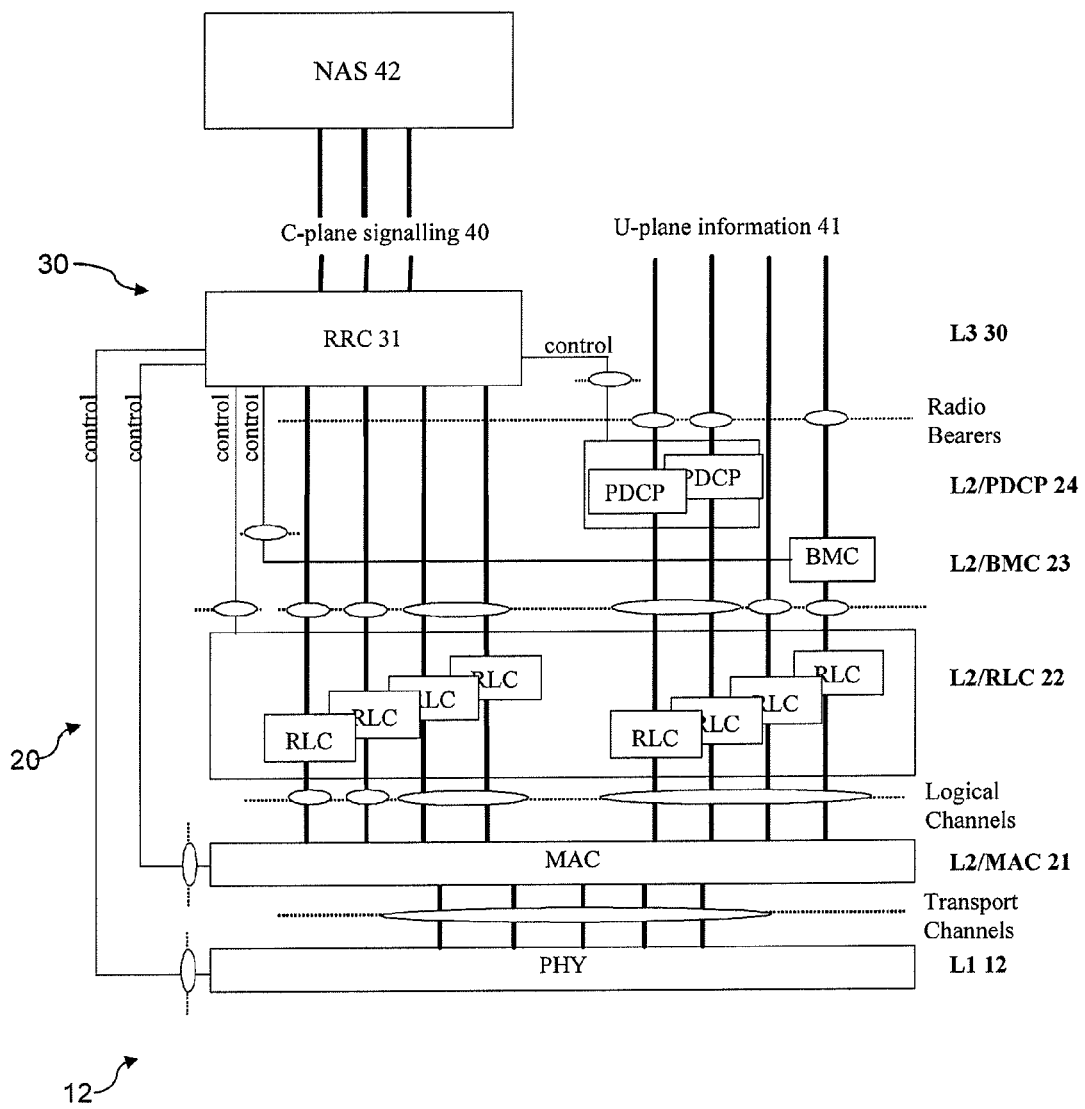
FIG. 2 is a diagrammatic representation of an example radio protocol architecture that can be used in embodiments of the present invention.

FIG. 2 shows schematically an example of the radio interface protocol architecture applicable for a UE 1 in for example E-UTRAN used in LTE systems. A similar "layer" architecture is used in other wireless systems. In overview and in general terms, there is a physical layer L1 12, a data link layer L2 20 and a network layer L3 30. The physical layer L1 12 offers information transfer services to MAC and higher layers and defines the relationship between the UE 1 and the wireless transmission medium. The data link layer L2 20 is split into following sublayers: Medium Access Control (MAC) 21, Radio Link Control (RLC) 22, Packet Data Convergence Protocol (PDCP) 23 and Broadcast/Multicast Control (BMC) 24. The network layer L3 and the RLC 22 are divided into a Control (C-) plane 40 (which in essence deals with control signals) and a User (U-) plane 41 (which in essence deals with user-generated data traffic). In the C-plane 40, the network layer L3 30 is partitioned into sublayers where the lowest sublayer, denoted as Radio Resource Control (RRC) 31, interfaces with the data link layer L2 20 and ultimately terminates in the radio access network. Also within the C-plane 40, the Network Access Stratum (NAS) 42 is above the RRC 31.

The NAS 42 is the highest level of the C-plane. The RRC 31 handles transport of NAS messages, for example attach requests and service requests, as well as establishment and release of RRC connections. NAS messages terminate in the MME 9.

The operation of the NAS 42 in an LTE system is defined by 3GPP TS 24.301, Version 11.4.0 (October 2012), incorporated herein by reference. Amongst the signalling procedures handled by the NAS 42 are mobility management and session management. As part of mobility management and session management, the NAS 42 may need to issue an attach request.

An attach request can be triggered by receipt of a reject message. For example, with reference to LTE and 3GPP TS 24.301, a reject message can trigger a re-attachment procedure (and thus require sending an attach request). Examples of such messages include a Tracking Area Update Reject message and a Service Reject Message.

It is acceptable behaviour under 3GPP TS24.301 V 11.4.0 for the MME 9 to reuse an existing RRC connection for NAS signalling or to require a new RRC connection for each NAS signalling procedure. However, the UE 1 has no way of knowing whether the MME 9 is configured to reuse an existing connection or require a new connection. Where the UE 1 makes an incorrect assumption about the operation of the MME 9 a delay of around 10 seconds in the attach process can occur in certain circumstances.

In a first case, following a reject message from the network, the UE needs to re-attach and assumes that the MME will re-use an existing connection for the NAS signalling. This assumption is incorrect and the MME expects a new connection to be used. The MME releases the existing connection and UE is notified of the release when it is complete. However, it has been found in practice that the connection release takes some time and the release notification is not received by the UE straight away. In a best case, where the MME releases the connection almost immediately, a delay of around 60 ms has been observed before the release is communicated to the UE. Meanwhile, the NAS in the UE can prepare and transmit an attachment request in around 28 ms following receipt of the reject message. This can create a situation where the NAS sends an attachment request reusing an existing RRC connection because it has not received a connection release notification. However, the request will fail because the MME expects to use a new connection. This results in failure in a lower communication layer than the NAS. On receipt of a lower layer failure 3GPP TS24.301 specifies that the NAS should start a timer T3411. Timer T3411 must expire before another attach request can be sent. T3411 is 10 seconds and creates a 10 second delay.

In a second case, following a reject message from the MME the UE needs to re-attach and assumes that the MME will use a new connection for the NAS signalling. This assumption is incorrect and the MME expects to re-use an existing connection. In this case the NAS waits to receive a connection release notification until a timer expires (T3440 in 3GPP TS 24.301). Such a connection release notification is never received and so the NAS waits the full length of the timer before it can assume that the connection will not be released and it should reuse the existing connection. T3440 is 10 seconds and this creates a 10 second delay.

Delays of this type are particularly likely when the UE 1 receives a reject message which is a Tracking Area Update (TAU) Reject or a Service Reject with cause values of #9, #10 or #40. Cause code #9 indicates that the User Equipment Identity cannot be derived by the network. Cause code #10 indicates implicitly detached. Cause code #40 indicates that no Evolved Packet System (EPS) bearer context is activated for the User Equipment. To give a specific example, a TAU Reject message with cause code #40 can be generated by the MME when the UE 1 is not registered with EPS (for example it is located a so called "2G" network, such as GSM, or a so called "3G" network, such as UMTS) and moves into an area of EPS coverage, such as an LTE network. Specifically, a TAU reject message with cause code #40 can occur when:

the UE is located in a 2G or 3G network,
the UE has performed a CS location update and GPRS attach, PDP context is not activated; and
reselection criteria has been met and reselection to LTE starts.

There specific circumstances have been observed to happen commonly in the field; the Tracking Area Update reject message with cause #40 is the expected and correct behaviour under 3GPP TS24.301 section 5.5.3.2.5. In response, the UE is expected to carry out a new attach procedure. However, as explained above, if the UE incorrectly assumes that the network will require reuse of an existing RRC connection, a delay of 10 seconds is incurred if the attach request reusing an existing RRC connection is sent before a connection release notification is received.

A delay can also occur when the UE incorrectly assumes that the network will require a new RRC connection. In that case it starts a timer T3440 and waits to receive a release notification until the expiry of timer T3440. If no release notification is received, the UE does not send an attach request until the expiry of timer T3440, which is 10 seconds.

In both these cases the 10 second delay leads to a poor experience for the user of the device.

In an exemplary embodiment of the present invention, an apparatus for attaching a wireless device to a wireless network, which can be part of a wireless device such as UE 1, is configured to transmit a first attach request to a network control apparatus using a first communication layer and an existing connection between the wireless device and the network control apparatus in response to a reject message. Responsive to a notification of a failure of the first attach request originating from a second communication layer which is lower than the first communication layer, transmit a second attach request to the network control apparatus using the first communication layer and a new connection between the wireless device and the network control apparatus, wherein transmission of the second attach request is effected independently of a timer started on receipt of the notification of a failure. For example, when applied to LTE, the connection can be an RRC connection and the first communication layer can be the NAS. The second communication layer can be any layer within the UE which is lower than the NAS, for example the RRC.

When operating according to this exemplary embodiment the UE first assumes that the network will reuse an existing connection and sends an attach request using an existing connection. If this assumption is correct, the attach request will be accepted by the network and the attach procedure according to 3GPP TS24.301 can be followed. However, if the UE receives a notification of the failure of the attach request from a lower layer, it can assume that this is because the network is configured to require a new connection and transmit a second attach request using a new connection as soon as possible. Therefore, unlike the situation above when the UE assumed incorrectly that an existing connection would be reused the UE does not need to wait for a timer to expire before sending an attach request and a delay associated with the timer is avoided. As a further benefit, this embodiment applies only the operation of the wireless device so no change to the operation of other network components, such as an eNB or MME in LTE systems, is required.

In another exemplary embodiment of the present invention, an apparatus for attaching a wireless device to a wireless network, which can be part of a wireless device such as UE 1, is configured to monitor for receipt of a connection release notification from the network control apparatus for a monitoring period. Responsive to receipt of a connection release notification within the monitoring period, the wireless device transmits a first attach request to the network control apparatus using a first communication layer and new connection between the wireless device and the network control apparatus. Otherwise, on expiry of the monitoring period, the wireless device transmits a first attach request to the network control apparatus using a first communication layer and an existing connection between the wireless device and the network control apparatus. Responsive to a notification of a failure of the first attach request originating from a second communication layer which is lower than the first communication layer, the wireless device transmits a second attach request to the network control apparatus using the first communication layer and a new connection between the wireless device and the network control apparatus, wherein transmission of the second attach request is effected independently of a timer started on receipt of the notification of a failure.

This provides a more balanced response of the wireless device in both networks that reuse connections and networks that require a new connection. In the previous embodiments, the UE favoured networks which reused an existing connection. In this embodiment, the UE takes no action for a monitoring period while it awaits a possible connection release notification from the network, allowing the first attach request sent to use a new connection if a connection release notification is received during the predetermined guard period. This improves the likelihood that the correct assumption will be made about the networks reuse of existing connections and reduce the need to transmit a second attach request.

In the event that a connection release notification is not received within the monitoring period but the network is nevertheless configured to require a new connection, this embodiment can recover without incurring a 10 second delay because a second attach request using a new connection is sent in response to a lower layer failure.

The monitoring period can be less than or equal to 2 seconds, less or equal to one second, less than or equal to 800 ms, between 500 ms and one second, less than or equal to 500 ms, approximately 65 ms, 70 ms or 75 ms or any other suitable value.

The monitoring period can be chosen with reference to network performance. For example, using the finding that a connection release notification is typically received around 60 ms after a reject message, the monitoring period can be set as slightly more than 60 ms, for example 65, 70 or 75 ms. However, the time to receive a connection release notification is not constant, it can vary for several reasons. For example congestion at the MME or eNB and routing delays between the MME and eNB can increase the length of time before it a connection release notification is received in LTE systems. Some embodiments consider the longest period before a release notification may be received to set the monitoring period. For example, if it can take up to 1000 ms for a release notification to be received in some circumstances, so in that case the monitoring period can be set to at least 1000 ms. Other embodiments may seek the reduce the monitoring period as much as possible, so that a majority, but not all connection release notifications will be received before the end of the monitoring period. For example the monitoring period may be chosen so that approximately 90%, 80%, 70% or 60% of connection release notifications will be received within the monitoring period. This has the advantage of minimising the delay incurred when the network is intending to reuse a connection (because in that case no connection release notification will be received and the monitoring period must expire before the first attach request reusing an existing connection can be sent).

Still further embodiments may determine the monitoring period with reference to measured or known network characteristics of a particular network or networks. For example, where a wireless device is provided by a network operator, the predetermined period can be chosen based on measurements taken on, or known characteristics of, that network operator's network. Where a wireless device is provided with localisation to a particular geographical region, the predetermined period can be set based on measurements taken on, or known characteristics of, networks operating in that geographical region.

In some embodiments a counter of the number of attach attempts or attach requests sent may be maintained. For example, in embodiments applied to LTE systems an Attach Attempt Counter may be incremented with each attach request sent. In that case, the counter is not incremented when said second attach request is sent. In other words, the counter is not changed if a second attach request using new connection is sent. This can give improved performance because the sending the second request as soon as possible can cause the counter to increase more quickly than expected.

In embodiments applied to LTE or LTE-A systems, the transmission of the second attach request can be effected independently of timer T3411. This avoids the delay associated with time T3411 in the event of a lower layer failure.

The transmission of the second attach can be effected if timer T3410 is running in some embodiments. Timer T3410 is started when an attach request is sent and runs until an attach accept or attach reject message is received. This ensures that the transmission of the second attach request does not occur if an attach accept or attach reject has since been received from the network and also limits the sending of a second attach request to the length of time T3410 (which is 15 seconds).

In embodiments applied to LTE or LTE-A systems, the processing and method may occur in response to a tracking area update reject or a service reject message. More specifically, in some embodiments, the processing and method may occur in response to Tracking Area Update Reject message or a Service Reject message which indicates a cause of: User Equipment identity cannot be derived by the network, Implicitly detached, or No EPS bearer context activated.

More detailed embodiments will now be described in terms of specific process flows between elements of an LTE system. Although these embodiments are applied to LTE systems they are not limited to such systems and can be applied to other network systems, such as LTE-Advanced.

Figure 3:
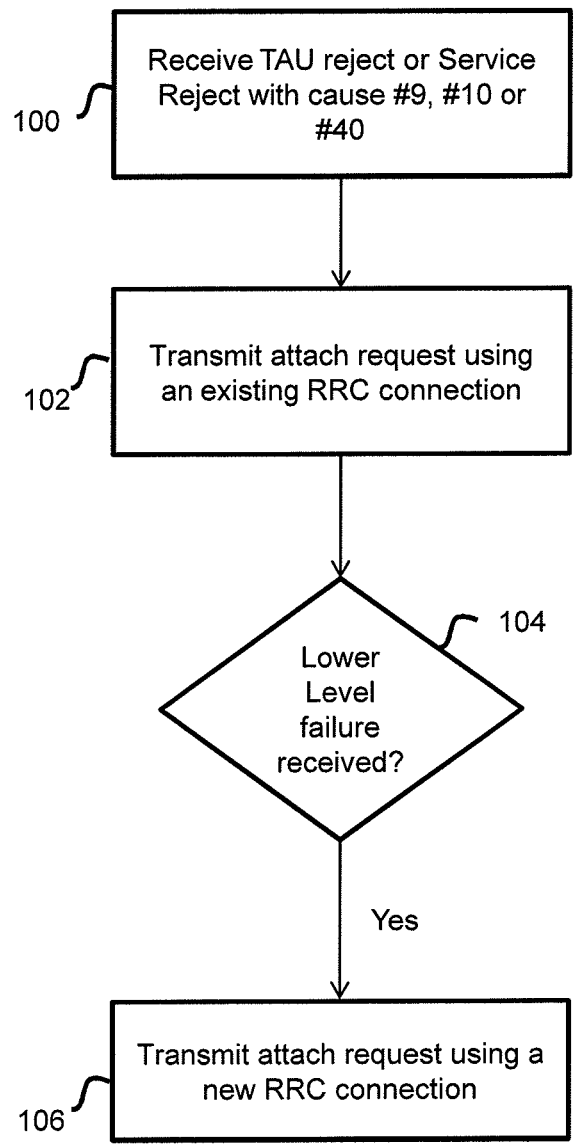
FIG. 3 depicts a flow chart of processing in a wireless device according to an exemplary embodiment of the invention.

FIG. 3 depicts a flow chart of processing in a wireless device according to an exemplary embodiment of the invention. In this embodiment, a UE assumes that the MME will reuse an existing RRC connection but can recover quickly if the MME instead requires a new RRC connection.

The processing is carried out in circumstances which have been identified as potentially leading to a long delay if the wrong assumption on MME configuration is made, specifically, the processing begins at step 100 when a TAU reject message or Service reject message with a cause code of #9. #10 or #40 is received. Next, at step 102, a first attach request is transmitted by the NAS using an existing RRC connection. If the MME is configured to reuse an existing connection the first attach request will be processed by the MME and execution will end. However, if the MME is configured to require a new connection a failure originating from a lower layer will be received. At step 104, if a failure notification from a lower layer is received execution proceeds to step 106 where a second attach request is transmitted by the NAS, this time using a new RRC connection.

Figure 4:
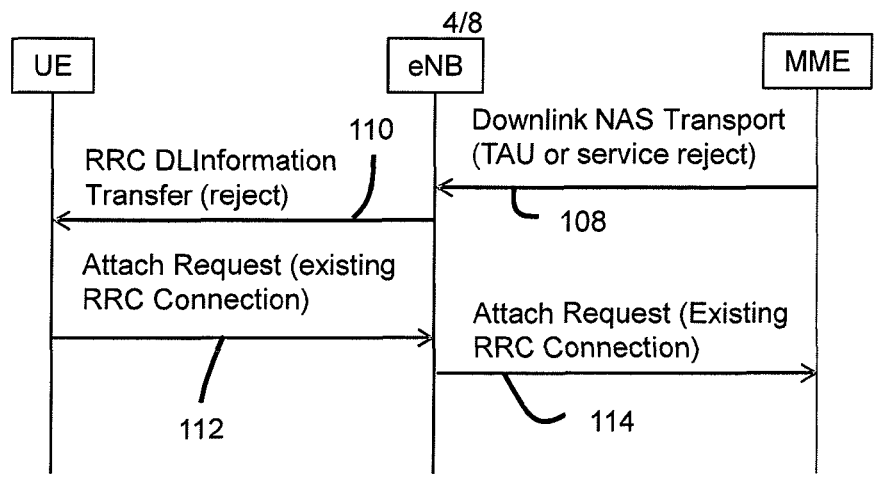
FIG. 4 is a simplified diagrammatic representation of message exchanges in the embodiment of FIG. 3 when used in a network which reuses an existing connection for attach request signalling.

FIG. 4 is a simplified diagrammatic representation of message exchanges in the embodiment of FIG. 3 when used in a network which reuses an existing connection for attach request signalling. To improve clarity, not all messages exchanged are depicted in FIG. 4, only those of relevance to the embodiment are shown and described.

The processing begins when the MME sends a downlink NAS transport message at 108 which includes a TAU reject or service reject with cause code #9, #10 or #40. This is forwarded on to the UE by the eNB at 110. On receiving the reject message the NAS of the UE begins the processing of FIG. 3 and transmits an attach request using an existing RRC connection at 112. The attach request is forwarded to the MME by the eNB at 114 and the MME then processes the attach request.

Figure 5:
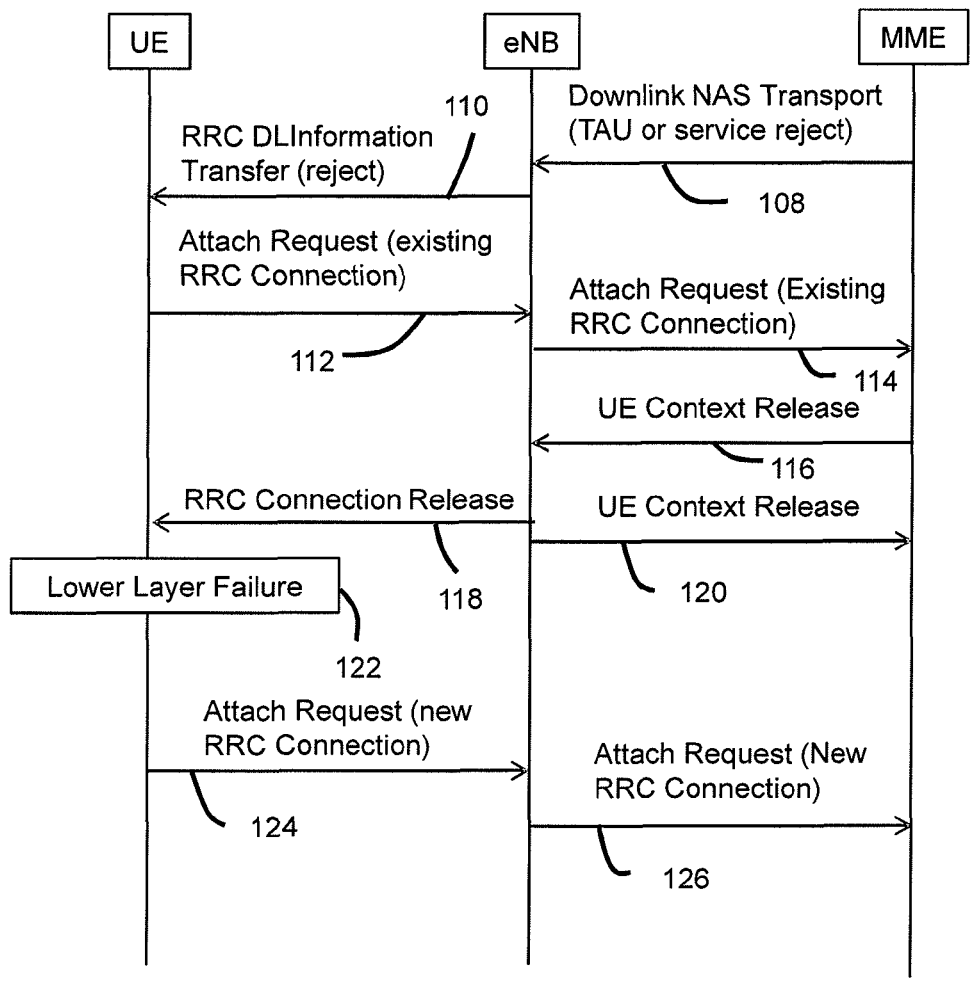
FIG. 5 is a simplified diagrammatic representation of message exchanges in the embodiment of FIG. 3 when used in a network which requires a new connection for attach request signalling.

FIG. 5 is a simplified diagrammatic representation of message exchanges in the embodiment of FIG. 3 when used in a network which requires a new connection for attach request signalling. To improve clarity, not all messages exchanged are depicted in FIG. 5, only those of relevance to the embodiment are shown and described.

The processing begins when the MME sends a downlink NAS transport message at 108 which includes a TAU reject or service reject with cause code #9, #10 or #40. This is forwarded on to the UE by the eNB at 110. On receiving the reject message the NAS of the UE begins the processing of FIG. 3 and transmits a first attach request using an existing RRC connection at 112. The first attach request is forwarded to the MME by the eNB at 114. However, because the MME expects to use a new RRC connection for NAS signalling, this attach request has no effect.

Meanwhile, the MME processes the release of the existing RRC connection and transmits at step 116 a UE context release message to the eNB. The eNB processes the context release and transmits an RRC connection release notification to the UE at 118 and a UE context release acknowledgement to the MME at 120. On receiving the RRC Connection Release notification a lower communication layer in the UE informs the NAS of a failure of the attach request at 122. In response, the NAS transmits a second attach request to the MME on a new RRC connection at 124 which is then forwarded by the eNB to the MME at step 126. The MME then processes the second attach request.

Figure 6:
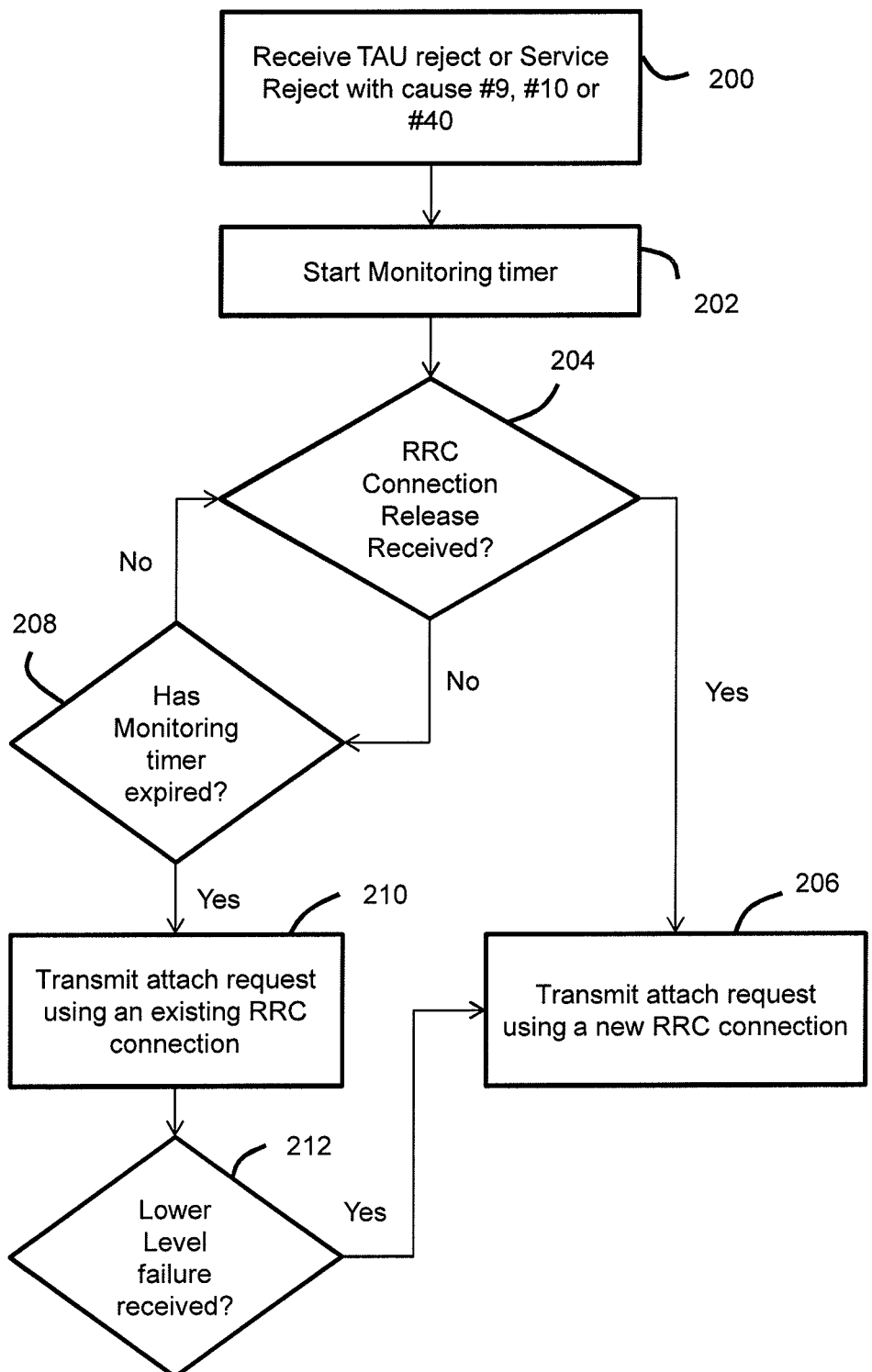
FIG. 6 depicts a flow chart of processing in a wireless device according to another exemplary embodiment of the invention.

FIG. 6 depicts a flow chart of processing in a wireless device according to another exemplary embodiment of the invention. In this embodiment a UE has a monitoring period in which it awaits a connection release notification before sending an attach request.

The processing is carried out in circumstances which have been identified as potentially leading to a long delay if the wrong assumption on MME configuration is made. More specifically, the processing begins at step 200 when a TAU reject message or Service reject message with a cause code of #9. #10 or #40 is received. A monitoring timer is started at step 202. For the duration of the monitoring timer, which is 1000 ms in this embodiment but can have different values in other embodiments, UE monitors for receipt of a connection release notification. At step 204 it is checked whether an RRC connection release notification has been received. If one has, execution proceeds to step 206 and a first attach request using a new RRC connection is transmitted by the NAS. The first attach request will be received an processed by the MME and execution will end.

If no RRC connection release notification has been received, execution proceeds to step 208 where the monitoring timer is checked to determine whether it has expired. If it has not expired execution returns to step 204. If it has expired execution proceeds to step 210. At step 210 it is assumed that because no connection release has been received the MME is configured to reuse an existing connection and a first attach request using an existing RRC connection is sent by the NAS.

However, the monitoring timer is not long enough to ensure that all connection release notifications are received before the monitoring timer has expired. If the MME is configured to require a new connection a failure originating from a lower layer will be received. At step 212, if a failure notification from a lower layer is received and execution proceeds to step 206 where a second attach request is transmitted by the NAS, this time using a new RRC connection.

Figure 7:
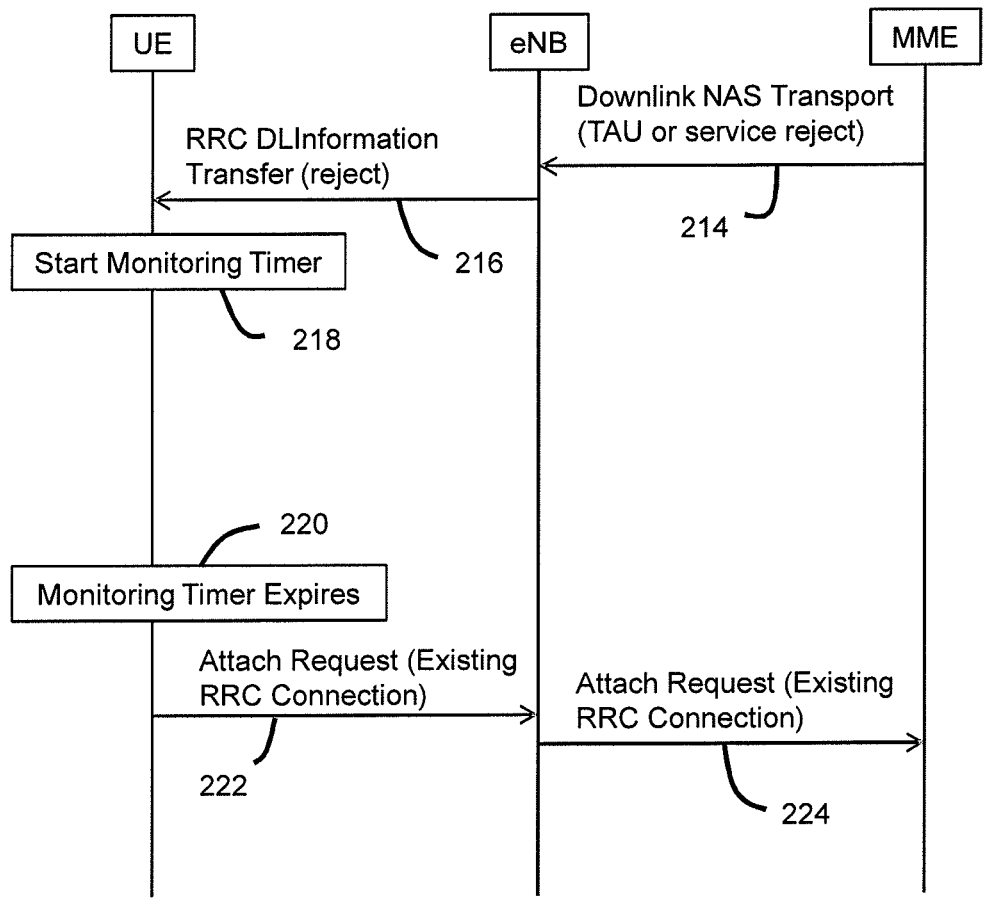
FIG. 7 is a simplified diagrammatic representation of message exchanges in the embodiment of FIG. 6 when used in a network which reuses an existing connection for attach request signalling.

FIG. 7 is a simplified diagrammatic representation of message exchanges in the embodiment of FIG. 6 when used in a network which reuses an existing connection for attach request signalling. To improve clarity, not all messages exchanged are depicted in FIG. 7, only those of relevance to the embodiment are shown and described.

The processing begins when the MME sends a downlink NAS transport message at 214 which includes a TAU reject or service reject with cause code #9, #10 or #40. This is forwarded on to the UE by the eNB at 216. On receiving the reject message the NAS of the UE starts the monitoring timer at 218. The UE than awaits receipt of an RRC connection release notification until the expiry of the monitoring timer at 220 one second later (no connection release notification is received because the MME is configured to reuse an existing connection and therefore no connection release is needed). The NAS transmits an attach request using an existing RRC connection at 222. The attach request is forwarded to the MME by the eNB at 224 and the MME then processes the attach request.

In this example, the typical time from the reject message to the issue of the correct attach request using an existing RRC connection is around 1 second (mainly determined by the length of the monitoring timer).

Figure 8:
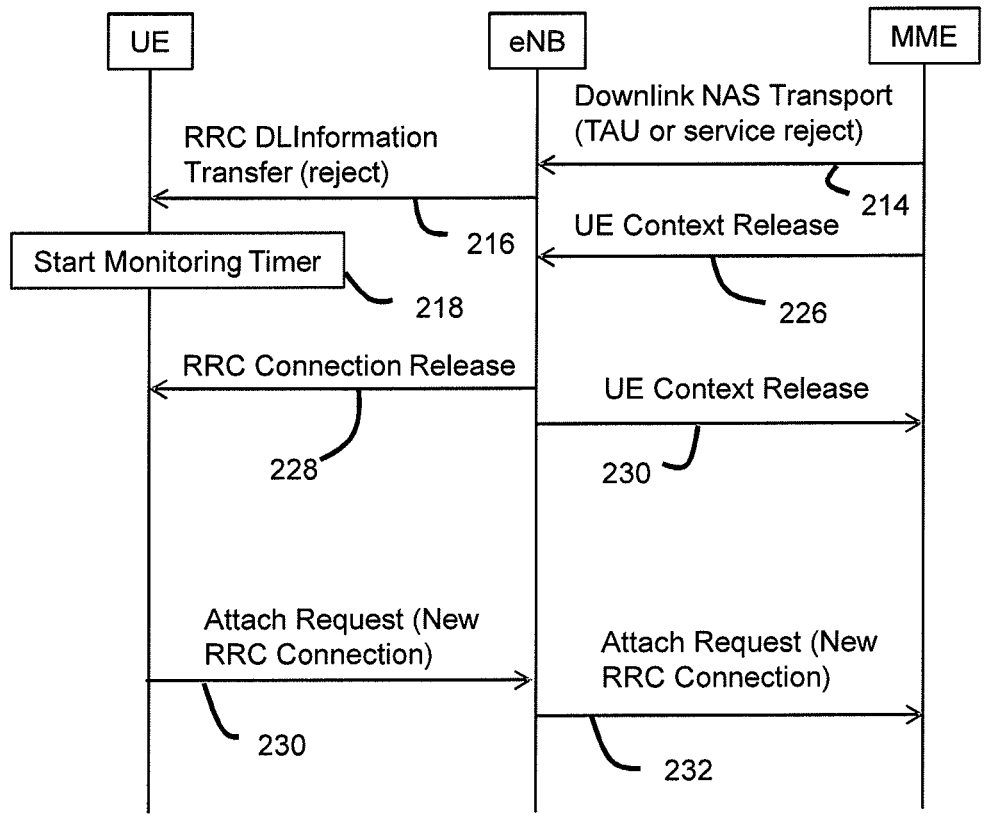
FIG. 8 is a simplified diagrammatic representation of message exchanges in the embodiment of FIG. 6 when used in a network which requires a new connection for attach request signalling and a connection release is received within a monitoring period.

FIG. 8 is a simplified diagrammatic representation of message exchanges in the embodiment of FIG. 6 when used in a network which requires a new connection for attach request signalling and a connection release is received within a monitoring period. To improve clarity, not all messages exchanged are depicted in FIG. 8, only those of relevance to the embodiment are shown and described.

The processing begins when the MME sends a downlink NAS transport message at 214 which includes a TAU reject or service reject with cause code #9, #10 or #40. This is forwarded on to the UE by the eNB at 216. On receiving the reject message the NAS of the UE starts the monitoring timer at 218. The UE than awaits receipt of an RRC connection release notification.

Meanwhile, the MME is in the process of releasing the RRC connection and transmits at step 226 a UE context release message to the eNB. The eNB processes the context release and transmits an RRC connection release notification to the UE at 228 and a UE context release acknowledgement to the MME at 230.

On receiving the RRC Connection release, the NAS transmits an attach request to the MME on a new RRC connection at 232 which is then forwarded by the eNB to the MME at step 234. The MME then processes the attach request.

In this example, the typical time from the reject message to the issue of the correct attach request using a new RRC connection is from around 211 to around 760 ms. In comparison with the example of FIG. 7, this is quicker but more signalling is required so there is a balance in performance between networks which use an existing RRC connection for NAS signals and networks that require a new RRC connection.

Figure 9:
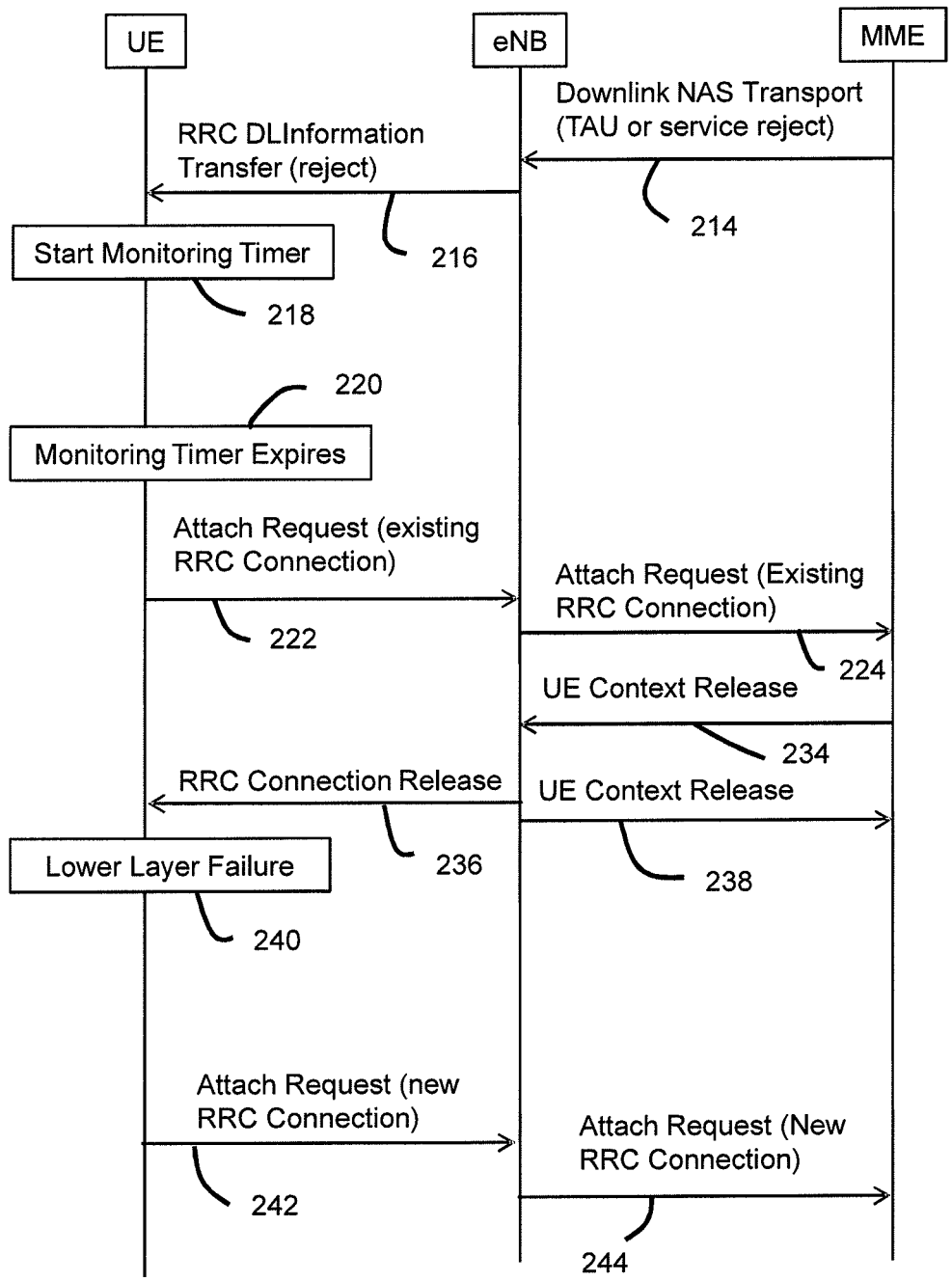
FIG. 9 is a simplified diagrammatic representation of message exchanges in the embodiment of FIG. 6 when used in a network which requires a new connection for attach request signalling and a connection release is not received within a monitoring period.

FIG. 9 is a simplified diagrammatic representation of message exchanges in the embodiment of FIG. 6 when used in a network which requires a new connection for attach request signalling and a connection release is not received within a monitoring period. To improve clarity, not all messages exchanged are depicted in FIG. 9, only those of relevance to the embodiment are shown and described.

The processing begins when the MME sends a downlink NAS transport message at 214 which includes a TAU reject or service reject with cause code #9, #10 or #40. This is forwarded on to the UE by the eNB at 216. On receiving the reject message the NAS of the UE starts the monitoring timer at 218. The UE than awaits receipt of an RRC connection release notification until the expiry of the monitoring timer at 220. No connection release notification is received because of a delay in the system longer than the monitoring period. The NAS transmits a first attach request using an existing RRC connection at 222. The attach request is forwarded to the MME by the eNB at 224. However, because the MME is expecting to use a new RRC connection for NAS signalling, this first attach request has no effect.

Meanwhile, the MME processes the release of the existing RRC connection and transmits at step 234 a UE context release message to the eNB. The eNB processes the context release and transmits an RRC connection release notification to the UE at 236 and a UE context release acknowledgement to the MME at 238. On receiving the RRC Connection Release notification, a lower communication layer in the UE informs the NAS of a failure of the attach request at 240. In response, the NAS transmits a second attach request to the MME on a new RRC connection at 242 which is then forwarded by the eNB to the MME at step 244. The MME then processes the second attach request.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. Apparatus comprising:
   at least one processor; and
   at least one memory including computer program instructions;
   the at least one memory and computer program instructions being configured to, with the at least one processor and responsive to receipt of a reject message from a network control apparatus, cause the apparatus to at least to perform:
   transmitting a first attach request to the network control apparatus using a first communication layer and an existing connection between the wireless device and the network control apparatus; and
   responsive to a notification of a failure of the first attach request originating from a second communication layer which is lower than the first communication layer, transmitting a second attach request to the network control apparatus using the first communication layer and a new connection between the wireless device and the network control apparatus, wherein transmission of the second attach request is effected independently of a timer started on receipt of the notification of a failure.

2. The apparatus of claim 1, wherein the at least one memory and computer program instructions are configured, with the at least one processor, not to increment a counter of the number of attach requests when said second attach request is transmitted.

3. The apparatus of claim 1, configured for use in a Long Term Evolution network or Long Term Evolution Advanced network.

4. The apparatus of claim 3, wherein the reject message is a Tracking Area Update Reject message or a Service Reject message.

5. The apparatus of claim 3, wherein the reject message is a Tracking Area Update Reject message or a Service Reject message which indicates a cause of:
   User Equipment identity cannot be derived by the network;
   Implicitly detached; or
   No EPS bearer context activated.

6. The apparatus of claim 3, wherein the transmission of the second attach request is effected independently of timer T3411.

7. The apparatus of claim 6, wherein the transmission of the second attach request is effected if timer T3410 is running.

8. A wireless device comprising the apparatus of claim 1.

9. A method of attaching a wireless device to a wireless network, the method comprising, responsive to receipt of a reject message from a network control apparatus, at the wireless device:
- transmitting a first attach request to the network control apparatus using a first communication layer and an existing connection between the wireless device and the network control apparatus; and
- responsive to a notification of a failure of the first attach request originating from a second communication layer which is lower than the first communication layer, transmitting a second attach request to the network control apparatus using the first communication layer and a new connection between the wireless device and the network control apparatus, wherein transmission of the second attach request is effected independently of a timer started on receipt of the notification of a failure.

10. The method of claim 9, comprising not incrementing a counter of the number of attach requests when said second attach request is transmitted.

11. The method of claim 9, wherein the wireless network is a Long Term Evolution network or Long Term Evolution Advanced network.

12. The method of claim 11, wherein the reject message is a Tracking Area Update Reject message or a Service Reject message.

13. The method of claim 11, wherein the reject message is a Tracking Area Update Reject message or a Service Reject message which indicates a cause of:
- User Equipment identity cannot be derived by the network;
- Implicitly detached; or
- No EPS bearer context activated.

14. The method of claim 11, wherein the transmission of the second attach request is effected independently of timer T3411.

15. The method according to claim 14, wherein the transmission of the second attach request is effected if timer T3410 is running.

16. Apparatus comprising:
- at least one processor; and
- at least one memory including computer program instructions;
- the at least one memory and computer program instructions being configured to, with the at least one processor and responsive to receipt of a reject message from the network control apparatus, cause the apparatus to at least to perform:
- monitoring for receipt of a connection release notification from the network control apparatus for a monitoring period;
- responsive to receipt of a connection release notification within the monitoring period, transmitting a first attach request to the network control apparatus using a first communication layer and new connection between the wireless device and the network control apparatus; or otherwise, on expiry of the monitoring period, transmitting a first attach request to the network control apparatus using a first communication layer and an existing connection between the wireless device and the network control apparatus; and
- responsive to a notification of a failure of the first attach request originating from a second communication layer which is lower than the first communication layer, transmitting a second attach request to the network control apparatus using the first communication layer and a new connection between the wireless device and the network control apparatus, wherein transmission of the second attach request is effected independently of a timer started on receipt of the notification of a failure.

17. The apparatus of claim 16, wherein the monitoring period is less than or equal to 1 second.

18. The apparatus of claim 16, wherein the at least one memory and computer program instructions are configured, with the at least one processor, not to increment a counter of the number of attach requests when said second attach request is transmitted.

19. The apparatus of claim 16 configured for use in a Long Term Evolution network or Long Term Evolution Advanced network.

20. The apparatus of claim 19, wherein the reject message is a Tracking Area Update Reject message or a Service Reject message which indicates a cause of:
- User Equipment identity cannot be derived by the network;
- Implicitly detached; or
- No EPS bearer context activated.

21. A method of attaching a wireless device to a wireless network, the method comprising, responsive to receipt of a reject message from a network control apparatus, at the wireless device:
- monitoring for receipt of a connection release notification from the network control apparatus for a monitoring period;
- responsive to receipt of a connection release notification within the monitoring period, transmitting a first attach request to the network control apparatus using a first communication layer and new connection between the wireless device and the network control apparatus; or otherwise, on expiry of the monitoring period, transmitting a first attach request to the network control apparatus using a first communication layer and an existing connection between the wireless device and the network control apparatus; and
- responsive to a notification of a failure of the first attach request originating from a second communication layer which is lower than the first communication layer, transmitting a second attach request to the network control apparatus using the first communication layer and a new connection between the wireless device and the network control apparatus, wherein transmission of the second attach request is effected independently of a timer started on receipt of the notification of a failure.

* * * * *